United States Patent [19]

Shelton

[11] Patent Number: 4,938,520

[45] Date of Patent: Jul. 3, 1990

[54] HOLD OPEN DEVICE FOR COMPARTMENT LID

[75] Inventor: Alan J. Shelton, Rochester, Mich.

[73] Assignee: General Motors Corporation, Detroit, Mich.

[21] Appl. No.: 446,365

[22] Filed: Dec. 5, 1989

Related U.S. Application Data

[62] Division of Ser. No. 213,795, Jun. 27, 1988.

[51] Int. Cl.[5] ........................ B62D 25/10; E05C 11/44

[52] U.S. Cl. ........................................ 296/76; 296/106; 292/278; 292/338; 292/DIG. 4; 292/DIG. 43; 217/60 F; 16/DIG. 10; 16/DIG. 17

[58] Field of Search ............................ 296/56, 76, 106; 292/267, 274, 278, 338, DIG. 4, DIG. 43; 16/DIG. 10, DIG. 17; 217/60 F

[56] References Cited

U.S. PATENT DOCUMENTS

| | | | |
|---|---|---|---|
| 2,434,598 | 1/1948 | Stegall | 180/69.21 |
| 2,741,930 | 4/1956 | Montooth et al. | 292/DIG. 4 X |
| 2,994,451 | 8/1961 | Hoag et al. | 217/60 F |
| 2,996,210 | 8/1961 | Thomas | 217/60 F |
| 3,000,044 | 9/1961 | Allen et al. | 292/278 X |
| 3,319,993 | 5/1967 | Riley, Jr. | 296/76 |
| 3,711,892 | 1/1973 | Tabor | 16/76 |
| 3,851,908 | 12/1974 | Hester et al. | 292/262 |
| 3,883,126 | 5/1975 | Nicholls | 267/64.12 |
| 3,891,111 | 6/1975 | Snazuk | 217/60 F |
| 3,977,712 | 8/1976 | Northrop | 292/338 |
| 4,070,050 | 1/1978 | Glock et al. | 292/339 |
| 4,307,875 | 12/1981 | Schnitzius et al. | 267/120 |
| 4,512,600 | 4/1985 | King | 292/338 |

FOREIGN PATENT DOCUMENTS

| | | | |
|---|---|---|---|
| 2826002 | 12/1979 | Fed. Rep. of Germany | 292/278 |

*Primary Examiner*—Dennis H. Pedder
*Attorney, Agent, or Firm*—William A. Schuetz

[57] ABSTRACT

A completely mechanical hold open device for a swingably mounted vehicle closure includes a pair of telescoping members pivotally connected to the closure and vehicle body and a releasable latching means for automatically holding the telescoping members in an extended position and hence the closure in its open position. The latching means is constructed such that it can be automatically released by merely exerting a downward force in excess of a predetermined magnitude on the closure to move the latter to its closed position.

4 Claims, 3 Drawing Sheets

HOLD OPEN DEVICE FOR COMPARTMENT LID

This is a division of application Ser. No. 213,795 filed on June 27, 1988. The present invention relates to a hold open device or support strut means for a vehicle closure or compartment lid and, more particularly, to a passive hold open device which is both automatically operable to hold a closure in its open position and to release the same to allow the closure to be moved to its closed position in response to a predetermined downward force being exerted on the closure.

Conventional automotive vehicle bodies have closures, such as hoods, deck lids or tail gates, which are swingably supported on the vehicle body for movement between open and closed positions. It is also conventional to provide an extendible and collapsible support strut means or hold open device to hold the closure in its open position. These hold open devices can be either mechanical, pneumatic or a combination thereof.

One type of mechanical device utilizes a pair of telescoping members respectively connected to the closure and vehicle body and which are urged toward an extended position by a spring to hold the closure in its open position. In such devices the spring force has to be overcome to collapse the telescoping members when the closure is moved to its closed positions. Examples of such devices are shown in U.S. Pat. Nos. 4,512,600; 3,319,993; 3,891,111; 3,711,892 and 3,851,908. Pneumatic hold open devices, such as gas spring struts, etc., operate in much the same manner. Examples of such devices are shown in U.S. Pat. Nos. 3,883,126; 3,977,712 and 4,307,875.

Another general type of mechanical hold open device is passive in that there are no spring forces acting on the closure in either its open or closed positions. These known hold open devices also usually employ a pair of telescoping members which are extendible and collapsible, and usually have a releasable latching means carried by one of the telescoping members and cooperably engageable with the other telescoping members to automatically latch the members together to hold the closure in its open position when moved thereto. In many of these prior hold opens, the latching means must be manually manipulate to release the same to allow the closure to be moved to its closed position. This usually requires two hands, one to hold the closure against falling and the other to release the latch. Examples of such passive hold open devices are shown in U.S. Pat. Nos. 2,994,451, assigned to the same assignee as the present invention; 2,434,598 and 4,070,050.

It is also known from U.S. Pat. No. 2,996,210, assigned to the same assignee as the present invention, to provide a passive hold open device in which a releasable latching means in the form of a star wheel is employed to automatically hold telescoping members in an extended position to hold the closure in its open position. To release the latching means, the operator need merely to lift the closure upwardly from its normal open position to cause the latch to be released and then lower the closure member to move it to its closed position. While this hold open device only requires the use of one hand to release the latch and move the closure, it requires a fairly complicated arrangement and a longer range of movement, since the closure has to be moved beyond its normal open position to release the latch means.

Accordingly, in accordance with the provisions of the present invention, a novel, mechanical, passive hold open device or support strut means is provided having a releasable latching means for automatically holding the telescoping members in an extended position and hence the closure in its open position and which can be released by merely exerting a downward force in excess of a predetermined magnitude to release the latch means and move the closure to its closed position. Thus, only one hand is required to move the closure member from its open position to its closed position, thus freeing the other hand of the operator to hold a package, etc.

It is a broad object of the present invention to provide a new and improved hold open device which is completely mechanical, passive in nature and in which the closure member when releasably latched in its open position can be moved to its closed position by merely exerting a downward force in excess of a predetermined magnitude on the closure member.

Another object of the present invention is to provide a new and improved hold open device, as defined in the next preceding object, and wherein the hold open device is of a relatively simple and economical construction, requires only a minimum number of parts and which is highly effective in operation.

A further object of the present invention is to provide a new and improved hold open device or support strut means for a closure which is swingably mounted on a vehicle body for movement between open and closed positions, in which the hold open device comprises a pair of telescoping members which are respectively connected to the closure and to the vehicle body and which have their adjacently located end portions slidably connected together so that the hold open device can be collapsed when the closure is moved to its closed position and can be extended when the closure is moved to its open position, and in which a releasable latch means carried by one of the telescoping members is cooperably engageable with the other telescoping member and includes a latch member and release member which are cooperably engageable with each other and are so constructed and arranged with respect to the telescoping members that the latch member functions to automatically latch the telescopic members together when the closure is moved to its open position and such that it affects automatic release of the latch member to allow the telescoping members to be collapsed when a downward force in excess of a given magnitude is exerted on the closure when the latter is initially being moved from its open position towards its closed position.

Yet another object of the present invention is to provide a new and improved hold open device, as defined in the next preceding object, and in which the latch member is supported by one of the telescoping members for movement between a latch position in which a pawl thereof extends through an opening in the telescoping member and engages a catch surface on the other telescoping member to hold the closure in its open position and an unlatched position in which the pawl is out of engagement with the catch surface to allow the hold open device to be collapsed and the closure to be moved to its closed position, a first biasing means for biasing the latch member towards its latched position, a release member cooperably engageable with the latch member and slidably supported on the one telescoping member for limited movement relative thereto and a second biasing means for biasing the release member toward a first position in which it does not interfere with the movement of the latch member between its latched and unlatched positions but which is movable relative to the one telescoping member from its first position toward a second position in opposition to the biasing force of the second biasing means to affect movement of the latch member from its latched position to its unlatched position to allow the hold open device to be collapsed when solely a downward force in excess of a given magnitude is exerted on the closure when the latter is initially being moved from its closed position toward its open position.

The present invention further resides in various novel constructions and arrangement of parts, and further objects, novel characteristics and advantages of the present invention will be apparent to those skilled in the art to which it relates and from the following detailed description of the illustrated, preferred embodiments thereof made with reference to the accompanying drawings forming a part of this specification and in which similar reference numerals are employed to designate corresponding parts throughout the several views, and in which.

Figure 1:
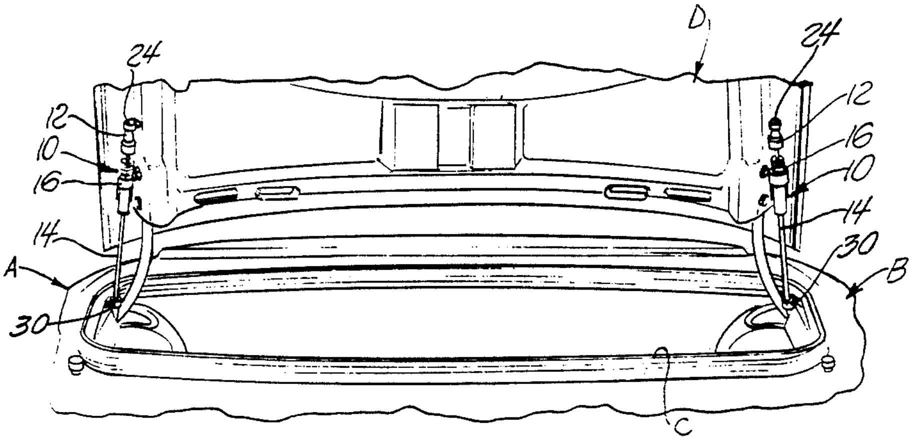
FIG. 1 is a fragmentary rear perspective view of an automotive vehicle having a rear deck lid shown in its open position and embodying the novel hold open device of the present invention.
Figure 7:
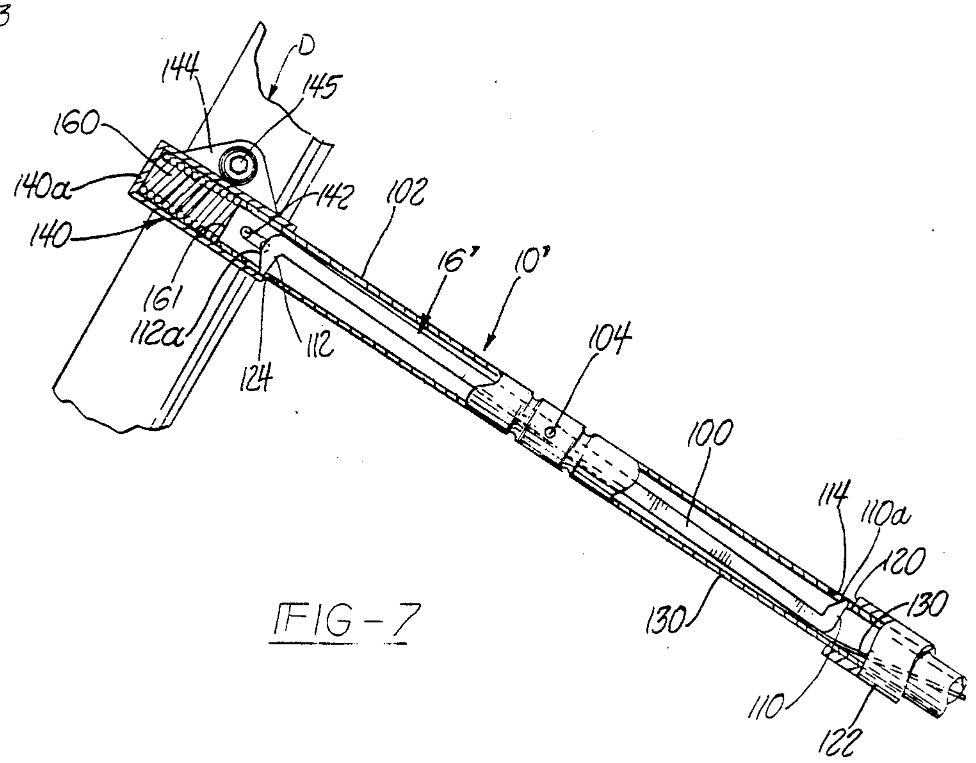
Figure 6:
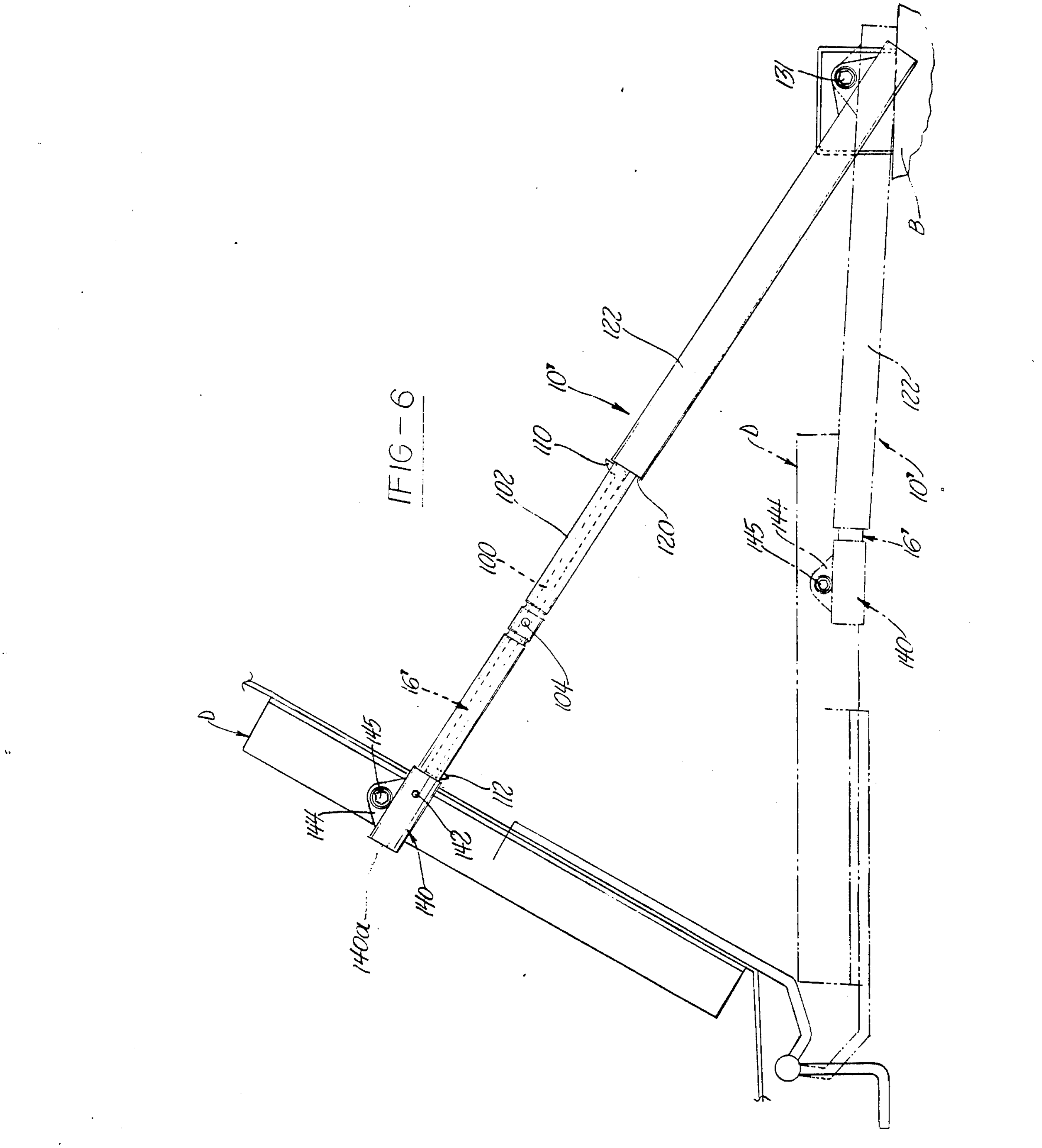

FIG. 6 is a side elevational view of an alternative embodiment of the novel hold open device of the present invention and showing the same connected to a vehicle body and a deck lid; and FIG. 7 is a fragmentary side elevation view like that shown in FIG. 6 but showing certain parts thereof in section and in different positions. Referring to FIG. 1 of the drawings, an automotive vehicle A is thereshown. The vehicle A comprises rear body structure B defining a rear trunk opening C. The trunk opening C is adapted to be closed off by a rear deck lid D which is suitably swingably mounted to the vehicle body structure B by a pair of gooseneck hinges (not shown) and in a manner well known and conventional in the art. The deck lid D is swingably mounted for movement between an open position, as shown in FIG. 1, in which access to the trunk of the vehicle A through opening C is permitted and a closed position in which the deck lid D would lie flush with the rear body structure B to close off the opening C. As is conventional, a suitable trunk lock would be provided to enable the trunk lid to be locked and unlocked from its closed position.

In accordance with the provisions of the present invention, a pair of novel hold open devices 10 are provided to hold the deck lid D in its open position, as shown in FIG. 1, when the latter is moved thereto. The hold open devices 10 are extensible and collapsible and function to hold the deck lid D in its open position and allow movement of the deck lid D to its closed position in response to exerting a predetermined downward force on the deck lid D.

Referring to FIGS. 1–5, each of the novel hold open devices 10 comprises, in general, a pair of telescoping members 12, 14 which are respectively, pivotally connected to the deck lid D and the body structure B of the vehicle A and a releasable latching means 16 carried by the telescoping member 12 and which is cooperably engageable with the telescoping member 14 to releasably latch the telescoping members 12 and 14 together when the deck lid D is moved to its open position, but which functions to release the deck lid D for movement to its closed position in response to exerting a predetermined downward force on the deck lid D.

Figure 2:
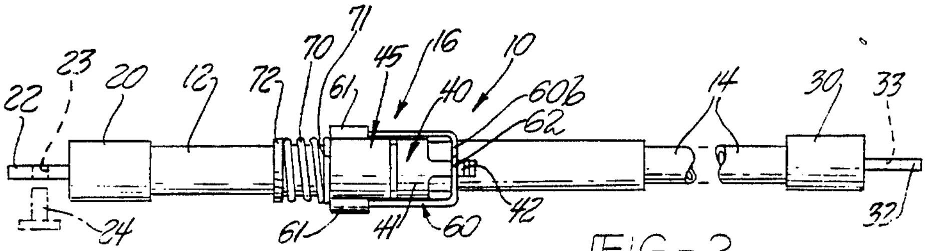
FIG. 2 is a top plan view of one embodiment of the novel hold open device of the present invention.
Figure 3:
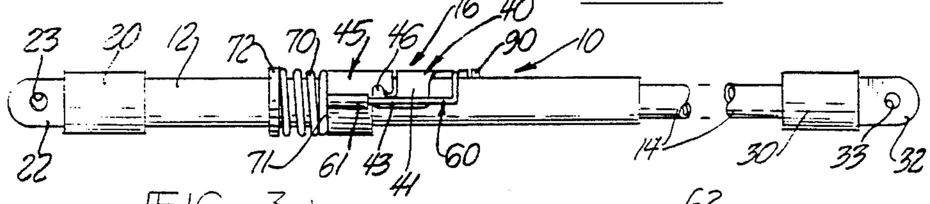
FIG. 3 is a side elevational view of the novel hold open device shown in FIG. 2.

The telescoping member 12 comprises a hollow cylindrical tube whose left end, as viewed in FIGS. 2 and 3, is received within a cylindrical bracket 20 via welding the same therein. The bracket 20 includes an axially extending ear 22 provided with an opening 23 to enable the same to be suitably pivotally connected to the deck lid D via a pivot pin means 24. The telescoping member 12 at its other end is open and the tube is also provided with a radially extending through slot or opening 28 adjacent its right end, as viewed in FIG. 4.

The telescoping member 14 comprises a hollow tube having an outside diameter which is less than the inside diameter of the telescoping member 12. The telescoping member 14 at its right end, as viewed in FIGS. 2 and 3, is suitably welded or otherwise secured within a cylindrical bracket 30. The bracket 30 has an axially extending ear 32 provided with an opening 33 to enable the tube 14 and brackets 30 to be pivotally secured inside the trunk to the rear body structure B of the vehicle A via a suitable pivot means 34. The tubular telescoping member 14 at its left end, as viewed in FIG. 4, is closed to define an end wall 35.

The telescoping members 12 and 14 have their adjacent ends slidably connected together, i.e., the right end of member 12 slidably receives the left end of member 14, so that the hold open device 10 can be extended and retracted or collapsed so as to vary the length thereof to enable the deck lid D to be swingably moved between its open and closed positions.

Figure 4:
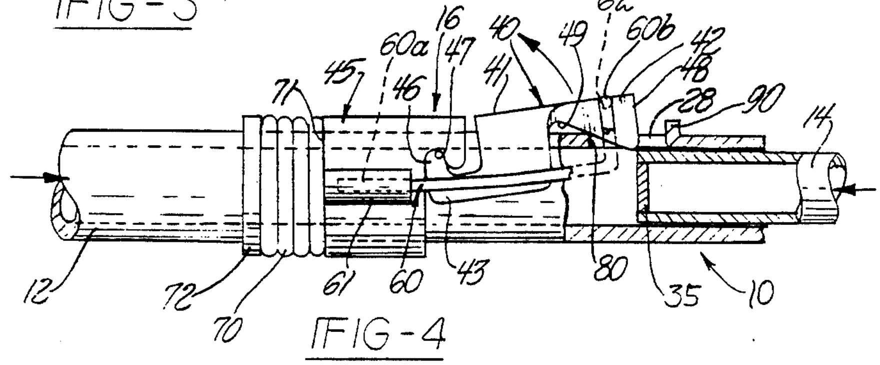
FIG. 4 is an enlarged fragmentary view with parts shown in section of the hold open device shown in FIG. 3 and showing different parts thereof in different positions.
Figure 5:
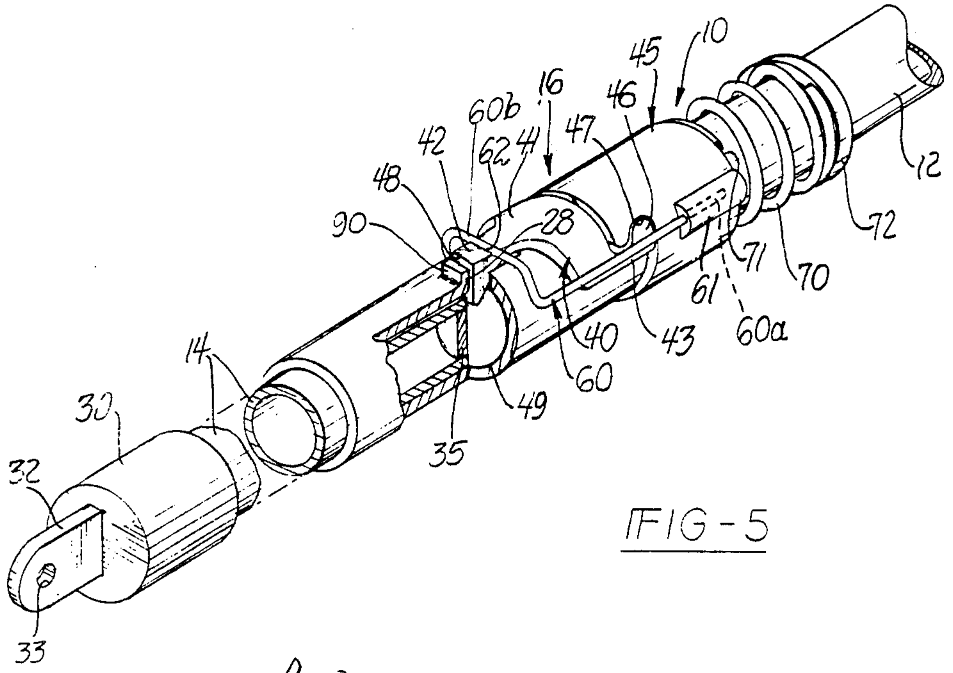
FIG. 5 is an enlarged perspective view of the hold open device shown in FIGS. 2 and 3 and with parts thereof shown in section.

As best shown in FIGS. 4 and 5, the releasable latch means 16 comprises a latch member 40 which is generally semi-cylindrical in shape, as viewed in cross section, and which is both slidably and pivotally supported on the outer telescoping member 12. The latch member 40 has an intermediate portion 41 which hemispherically surrounds the tubular telescoping member 12, a right end portion 42 in the form of a pawl which is adapted to be received through an opening 28 in the telescoping member 12 and a left end portion 43 which is adapted to be cooperably connected with a release member 45. The left end portion 43 comprises a pair of spaced ears 46 which are pivotally received in complementary shaped recesses 47 at the right end of the release member 45. The pivotal or rotatable fit between the ears 46 and the recesses 47 in the release member 45 enables the latch member 40 to be pivoted relative to the release member 45 as shown by the differences in the relative positions of the members 40 and 45 in FIGS. 3 and 4.

As best shown in FIG. 4, the pawl 42 has a flat or planar rightmost surface 48 and a tapered cam surface 49 forming a transition between the rightmost end and the intermediate portion 41 of the latch member 40. The release member 45 comprises a cylindrical sleeve which is slidably mounted on the tubular telescoping member 12 for limited sliding movement relative thereto. The sleeve adjacent its right end defines the recesses 47 for receiving the ears 46 on the latch member 40.

The latch member 40 is pivotally movable relative to the sleeve 45 between a latched position, as shown in FIGS. 3 and 5, in which the pawl 42 thereof is located through the opening 28 in the outer telescoping member 12 and such that its rightmost surface 48 forms an abutment or stop which is engageable with the end wall 35 of the telescoping member 14 and a release position, as shown in FIG. 4, in which the latch member 40 is pivoted relative to the sleeve 45 such that the pawl 42 thereof is disposed radially outwardly of the path of movement of the tubular telescoping member 14 so as to enable the member 14 to be slidably moved within the tube 12.

The latch member 40 is normally spring biased towards its latched position, as shown in FIGS. 3 and 5, by a first spring means 60. The spring means 60 comprises a wire spring which is generally U-shaped and has its free ends 60*a* secured within bosses 61 on opposite sides of the release member or sleeve 45 and which has its intermediate bight portion 60*b* received within a recess 62 in the top side of the pawl 42. The bight portion 60*b* engages and biases the pawl 42 radially inwardly of the tubular telescoping members 12 and 14. The pawl 42 has a flat on its top side provided with the recess or groove 62 in which a straight section of the bight portion 60*b* of the spring 60 is retained. The bight portion 60*b* of the spring 60 overlies the pawl 42 and serves to both bias the latch member 40 and pawl 42 radially inwardly of the tubular telescoping members 12 and 14 and the spring also retain the latch member 40 pivotally connected to the release member 45.

The release member 45 and the latch member 40 are normally biased toward a normal or first position, as shown in FIGS. 3 and 5, by a second spring biasing means 70. The second spring biasing means comprises a compression spring having one end in abutting engagement with the right end 71 of the sleeve 45 and its other end in abutting engagement with an annular collar 72 welded or otherwise secured to the tubular member 12.

The operation of the hold open device 10 will now be described. When the deck lid D is in its closed position, the telescoping member 14 is retracted within the telescoping member 12 and the latching member 40 is in the position shown in FIG. 4 in which its pawl 42 would be riding or resting on the outer surface of the tubular telescoping member 14. When the operator opens the trunk lock and moves the deck lid D from its closed position towards its open position, the hold open device 10 will be extended as a result of the telescoping members 12 and 14 being moved away from each other. When the deck lid D reaches its open position, the end wall 35 of the tubular member 14 will be disposed immediately to the right of a pawl 42, as viewed in FIG. 4. When this occurs, the spring means 60 will cause the latch member 40 to be pivoted in a clockwise direction about the pivotal connection between the ears 46 and the release sleeve 45 to cause the pawl 42 to move through the opening 28 and be disposed in the path of movement of the end wall 35 of the tubular telescoping member 14. Thus, when the operator releases the deck lid, the engagement between the end surface 48 of the pawl of the latch 40 and the tubular member 14 will prevent the deck lid from moving towards its closed position.

When the operator desires to move the deck lid D from its open position towards its closed position, he will merely push down on the deck lid D with a downward force in excess of a predetermined magnitude. When this occurs, the engagement between the pawl 42 and the end wall 35 of the tubular member 14 will cause the latch member 40 and the release sleeve 45 to move toward the left relative to the member 12, as viewed in FIG. 4, and compress the compression spring 70. As this occurs, the surface 80 on the outer tubular member 12 defining the opening 28 engages the tapered cam surface 49 on the pawl 42 and causes the latch member 40 to be moved radially outwardly about its pivot with the release member 45. When the pawl 42 has been moved radially outwardly so as to be disposed out of the path of movement of the telescoping member 14, the telescoping member can move therepast and collapse within the tube 12. As the tubular member 14 moves within the tubular member 12, the pawl 42 will merely ride on the outer cylindrical surface of the member 14. Also, as soon as the pawl 42 clears the end wall 35, the spring 70 will return the sleeve and latch member 40 to the right relative to the tube 12. A suitable stop 90 formed on the outer tube 12 is provided to engage the latch member 40 to prevent excessive movement of the release member and latch member 40 toward the right relative to the tube 12.

FIGS. 6 and 7 show an alternative embodiment of a novel hold open device 10' of the present invention. The FIGS. 6 and 7 embodiment differs from the FIGS. 2–5 embodiment in that a different latch means 16' is provided. The latch means 16' comprises a latch member 100 in the form of an elongated rod which is located within the smaller diameter hollow tubular telescoping member 102 and is pivotally connected thereto intermediate its ends by a pivot pin means 104. The latch member 100 at its opposite ends respectively, has a transversely or normally extending first pawl and second pawls 110 and 112. Both pawls 110 and 112 have a tapered cam surface 110*a* and 112*a*. The tubular member 102 has a radially extending through opening 114 adjacent the pawl 110 and through which the pawl 110 can extend to engage a cylindrical end surface 120 on the larger diameter telescoping member 122. The tube 102 also has a radial extending through opening 124 adjacent the pawl 112 and through which the pawl 112 can extend. The latch member 100 is normally spring biased toward a latched position by a leaf spring 130 having one end connected to the latch member 100 and its other end connected to the tubular member 102. The latch member 100 when its latched position, as shown in FIG. 6, has its pawls 110 and 112 extending through the openings 120 and 124. As shown in FIG. 6, the larger diameter tubular member 122 is pivotally connected at its end remote from the tubular member 102 to the body structure B in the trunk via a bracket and pivot means 131.

The latch member 100 is movable from its latched position, as shown in FIG. 6, to an unlatched position, as shown in FIG. 7, in which the pawls 110, 12 are received within the tubular telescoping member 102 by a release member 140. The release member 140 comprises a cylindrical sleeve having an outer closed end 140*a* which is slidably supported on the tubular telescoping member 102 for limited movement relative thereto via a pin and slot connection, as designated by reference numerals 142. As viewed in FIG. 7, the sleeve 140 is integrally connected to an ear 144, which in turn is pivotally connected to the deck lid D by a pivot pin means 145. In this embodiment, the sleeve 140 also forms a bracket means for pivotally connecting the telescoping member 102 to the deck lid D as opposed to using a separate sleeve and bracket member, as shown and described in the FIGS. 2–5 embodiment. The sleeve 140 is biased toward a first position in which the pin of the pin and slot connection 142 is located at the rightmost end of the slot by a compression spring 160. The compression spring 160 has one end in abutting engagement with the closed end wall of the sleeve 140 and its other end in abutting engagement with the cylindrical end 161 of the tubular telescoping member 102.

The operation of the second embodiment of the hold open device 10' will now be described. When the deck lid D is in its closed position, the tubular members 102, 122 are collapsed such that the tube 102 is disposed within the tube 122. In this position, the latch member 100 is in the position shown in FIG. 7 and with the pawl 110 thereof riding on the inner surface of the outer telescoping member 122.

When the deck lid D is moved from its closed position towards its open position, the tube 102 slides relative to the tube 122 until the deck lid D is at its open position whereupon the spring 130 biases the latch member 100 from its unlatched position, as shown in FIG. 7, to its latched position, as shown in FIG. 6, in which the pawl 110 thereof is disposed through the opening 114. When this occurs, the deck lid D upon being released cannot be moved to its closed position due to the engagement between the pawl 110 and the end 120 of the tubular member 122.

When the operator desires to close the deck lid D, he merely has to pull down on the deck lid D with a predetermined downward force. As best shown in FIG. 7, as the deck lid D is moved down with a predetermined force the tube 102 will slide within the sleeve 140 in opposition to the biasing force of the spring 160. This causes the pin of the pin and slot connection 142 to be moved from its rightmost position towards its leftmost position in the slot and causes the end of the sleeve to engage the tapered surface 112*a* of the pawl 112 of the latch member 100. When this occurs, the latch member 100 is cammed in a clockwise direction to move the latch member 100 wholly within the outer tube 102 and the pawl 110 within the tube 102. When this occurs, the tube 102 can then be moved inwardly relative to the tube 122 and with the spring 160 returning the sleeve 140 to its normal leftmost position relative to the tubular member 122, as shown in FIG. 7.

From the foregoing, it should be apparent that novel hold open devices have been provided which are of a relatively simple, economical construction, are completely mechanical in nature and are passive in that no spring forces are exerted on the deck lid when the latter is either in its open or closed positions.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The embodiments of the invention in which an exclusive property or privilege is claimed are defined as follows:

1. In a vehicle body having a closure swingably mounted thereon for movement between open and closed positions and a support strut means for holding said closure in its open position, said support strut means comprising a pair of telescoping members, one of which has one end pivotally connected to said closure and the other of which has one end pivotally connected to said vehicle body, said telescoping members having their adjacently located end portions slidably connected together so that the strut means can be collapsed when the closure is moved toward its closed position and can be extended when the closure is moved toward its open position, and a releasable latch means carried by one of said telescoping members and cooperably engageable with the other of said telescoping members to hold the closure in its open position when moved thereto, the improvement being that said releasable latch means comprises a latch member pivotally supported by one of said telescoping members for movement between a latched position in which a first pawl thereof extends through an opening in said one member and engages a catch surface on the other of said members to hold said closure in its open position and an unlatched position in which the first pawl is out of engagement with said catch surface to allow said strut means to be collapsed and said closure to be moved to its closed position, first spring biasing means for biasing said latch member toward its latched position, a release member cooperably engageable with a second pawl of said latch member and slidably supported on said one telescoping member for limited movement relative thereto, second spring biasing means operatively connected with said one telescoping member and said release member for biasing said release member toward a first position in which it does not interfere with movement of said latch member between its latched and unlatched positions, said release member being movable relative to said one telescoping member in opposition to the biasing force of said second biasing means from its first position toward a second position and engaging a cam surface on said second pawl to effect movement of said latch member from its latched to its unlatched position to allow said strut means to collapse when solely a downward force in excess of a given magnitude is exerted on the closure when the latter is initially being moved from its open position toward its closed position.

2. In a vehicle, as defined in claim 1, and wherein said one telescoping member is hollow, said latch member comprises a rod located within said one telescoping member and pivotally connected thereto intermediate its ends and said first and second pawls are located at opposite ends of said rod.

3. In a vehicle, as defined in claim 2, and wherein said first spring biasing means comprises a leaf spring having one end, adapted to be connected to said one telescoping member and its other end connected to said latch member.

4. In a vehicle, as defined in claim 2, and wherein said second pawl has a tapered cam surface which is engageable by said release member when the latter is moved from its first position toward its second position.

* * * * *